March 11, 1952     C. M. O'LEARY     2,589,120
POWER TRANSMITTING APPARATUS

Filed May 2, 1946     3 Sheets-Sheet 1

INVENTOR.
Charles M. O'Leary.
BY
Harness, Dickey & Pierce.
ATTORNEYS.

March 11, 1952 C. M. O'LEARY 2,589,120
POWER TRANSMITTING APPARATUS
Filed May 2, 1946 3 Sheets-Sheet 2

INVENTOR.
Charles M. O'Leary,
BY
Harness, Dickey & Pierce
ATTORNEYS.

March 11, 1952 C. M. O'LEARY 2,589,120
POWER TRANSMITTING APPARATUS
Filed May 2, 1946 3 Sheets-Sheet 3

INVENTOR.
Charles M. O'Leary.
BY
Harness, Dickey & Pierce.
ATTORNEYS.

Patented Mar. 11, 1952

2,589,120

UNITED STATES PATENT OFFICE 2,589,120

POWER TRANSMITTING APPARATUS

Charles M. O'Leary, Los Angeles, Calif.

Application May 2, 1946, Serial No. 666,626

16 Claims. (Cl. 60—54)

1

The present invention relates to a torque transmitting apparatus incorporating a hydrokinetic torque transmitter, and the present application is a continuation-in-part of applicant's copending application, Serial No. 571,656, filed January 6, 1945, now abandoned, and covers subject matter also disclosed in applicant's prior copending application, Serial No. 602,619, filed June 30, 1945.

Hydrokinetic torque transmitters have been widely used because of the fact that they provide a yielding torque transmitting drive free of mechanical friction and wear. Those now in use are of two types: first, torque converters which multiply torque; and, second, couplings which operate simply as a hydrokinetic torque coupling. Both types have an efficiency curve which, for a given speed of the input shaft, rises from zero when the output shaft is stationary to a maximum value at one speed of the driven shaft. In the case of the hydrokinetic torque converters, the output speed of maximum efficiency is at a speed less than that of the input speed, and the efficiency curve drops back to zero before the output shaft reaches the speed of the input shaft. Hydrokinetic torque couplings, on the other hand, have an efficiency curve which approaches maximum as the speed of the output shaft approaches that of the input shaft. In both types, all energy lost in the transmitter appears as heat in the operating liquid, and this heat must be dissipated to avoid overheating. The difficulty of dissipating this heat has long been a serious obstacle to the use of hydrokinetic torque transmitters in applications where they are called upon to operate for substantial periods at speed ratios of low efficiency because the power required to operate a cooling fan and/or to circulate the operating liquid through a cooling radiator, if sufficient to dissipate the heat generated during stall or reverse braking operations, absorbed excessive power and overcooled the liquid when the transmitter was operating at an efficient speed ratio.

Accordingly, it is the general object of the invention to provide an improved torque transmitting apparatus having all of the desirable characteristics of prior hydrokinetic torque transmitters but capable of operating for sustained periods at inefficient speed ratios, including stall and reverse braking conditions, and having greater overall torque capacity and efficiency throughout the complete speed ratio range.

Another object of the invention is to provide means to cool the operating liquid of a hydrokinetic torque transmitter which will automatically adjust itself to the cooling needs of the transmitter and hence prevent overheating without absorbing unnecessary energy when the transmitter is operating efficiently.

Another object is to provide means operable automatically to transmit a portion of the torque from the driving to the driven shaft of a hydrokinetic torque transmitter independently of the operating liquid and in an amount which increases as a function of the extent to which the ratio of the speed of the driven shaft to that of the driving shaft falls below the speed ratio of maximum efficiency.

Another object of the invention is to provide means of the type last mentioned which is operable automatically to feed back to the driving shaft of a torque converter a portion of the torque delivered to the driven shaft when the speed ratio of the converter exceeds the ratio of maximum efficiency in order to reduce the speed of the driven shaft for a given net torque output and, therefore, cause the apparatus to operate more efficiently under reduced loads.

Another object of the invention is to provide a cooling means for a hydrokinetic torque transmitter which is driven wholly from the driving shaft of the transmitter when the driven shaft is rotating forwardly at a speed ratio less than that of maximum efficiency and which is driven in part or whole by the driven shaft when the latter is rotating reversely.

Another object of the invention is to provide cooling means of the type last mentioned which, when applied to a hydrokinetic torque converter, is driven wholly by the driven element of the converter when the converter is operating at a speed ratio in excess of its ratio of maximum efficiency in order to load up the driven element and thereby cause the converter to operate at a more efficient speed ratio.

Other objects include the provision of apparatus of the type mentioned which is rugged, simple in construction and which may be assembled to a large degree from standard elements.

Other objects and advantages of the invention will become apparent from the following specification, the accompanying drawings and the appended claims.

Since the present invention is of peculiar utility in heavy duty applications for which hydrokinetic torque converters are preferred to couplers and since the invention has a number of important advantages achieved only when it incorporates a torque converter, it is illustrated as incorporating a converter. As hereinafter pointed out, however, some of its advantages may be realized by substitution of a hydrokinetic coupler for the converter.

Figures 1, 2, 3:
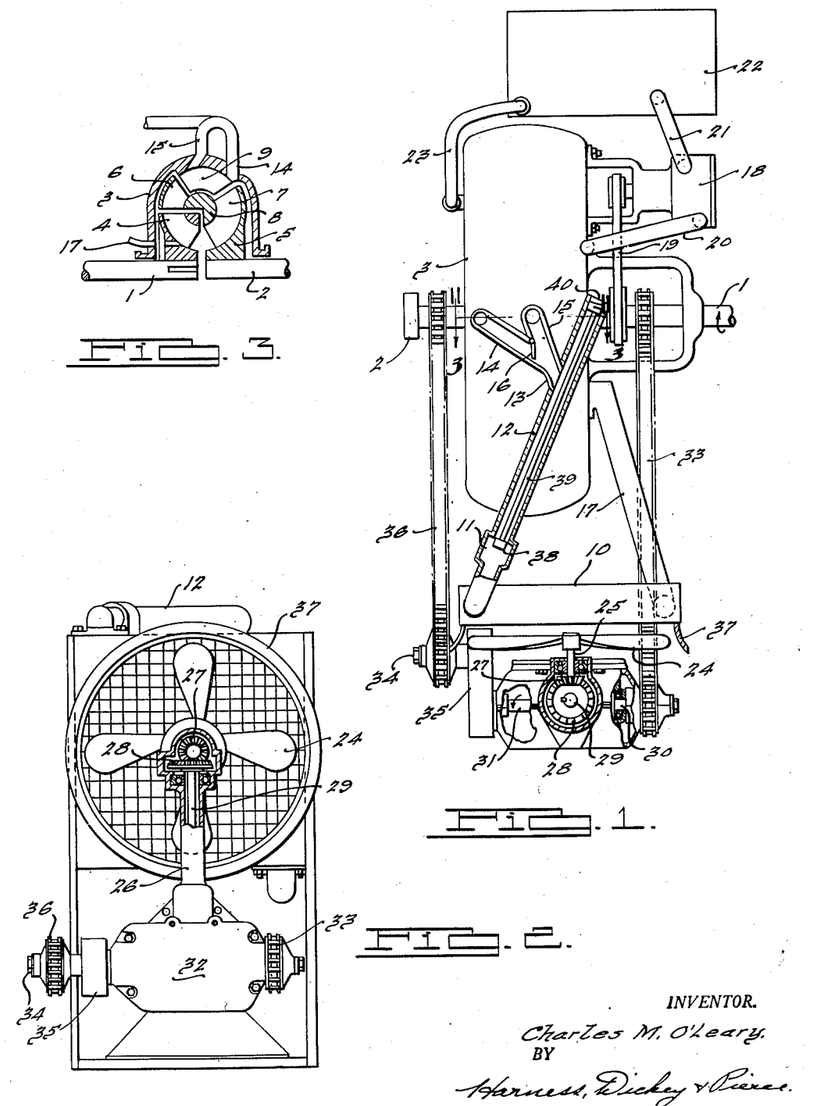
Figure 1 is a plan view, partly in section, of the preferred form of the improved apparatus incorporating a hydrokinetic torque converter.
Figure 2 is an elevation view, partly in section, of a portion of the mechanism shown in Figure 1.
Figure 3 is a more or less diagrammatic sectional view of the torque converter taken on the line 3—3 of Figure 1.

As shown in Figure 1, the apparatus of the present invention includes a driving shaft 1, adapted to be connected to an engine or other suitable source of power, and a driven shaft 2, which may be connected to any device to which it is desired to apply power. Since the invention is of peculiar utility as a power transmitting apparatus for hoisting drums, shaft 2 may be connected either directly or through a change speed transmission to a hoisting drum in any desired manner.

Shafts 1 and 2 are connected by any suitable or conventional form of hydrokinetic torque converter. While the detailed design and construction of such converters varies, the essential elements of the simplest form of torque converter are illustrated diagrammatically in Figure 3. As there shown, the converter comprises a stationary casing 3 surrounding the ends of shafts 1 and 2. The casing encloses a pump impeller 4, which is fixed to shaft 1, and a two-stage runner or driven element 5 fixed to the shaft 2. The runner is provided with two stages of blades, indicated by the numerals 6 and 7, which are fixed together by means of an annular member 8. Intermediate the runner stages 6 and 7 are a plurality of stationary guide vanes 9 fixed to the casing 3. The casing is filled with liquid in the usual manner, with the result that rotation of shaft 1 causes the impeller blades 4 to circulate the liquid around the annular member 8 in a clockwise direction, as viewed in Figure 3, thereby transmitting torque to the runner and, consequently, to the driven shaft 2. It will be understood that any desired number of stages of blading may be provided on the runner so long as each pair of stages is separated by a stationary guide vane. In the usual practice, two or three stages are employed.

Figure 4:
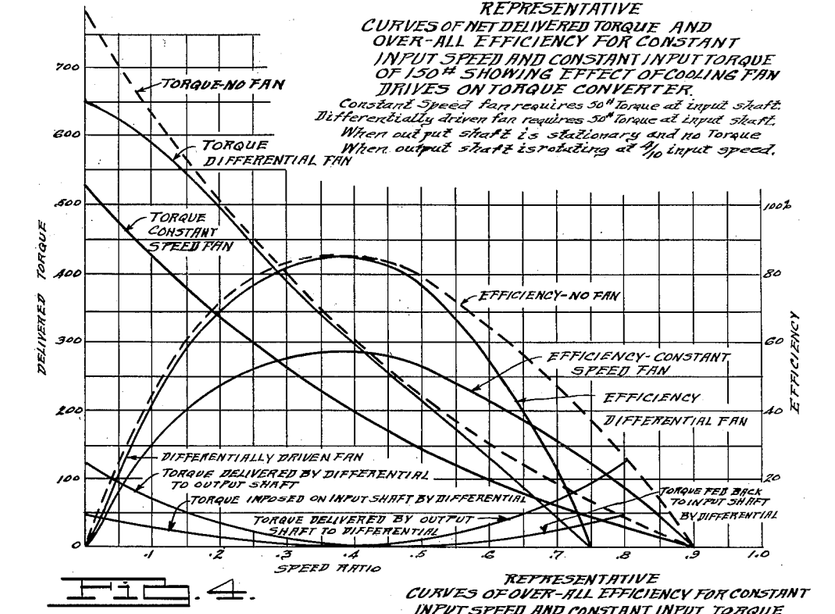
Figures 4 and 5 are graphs illustrating the performance characteristics of the preferred form of the invention.

As will be observed from the dotted line curves in Figure 4, which are representative of the torque and efficiency versus speed ratio characteristics of a typical torque converter, the delivered torque for a constant input speed reduces from a maximum when the output shaft is stationary to zero as the output shaft speed approaches that of the input shaft. At the same time, the efficiency of the converter increases from zero when the output shaft is stationary to a maximum and then declines to zero as the output shaft speed approaches that of the input shaft. The converter for which curves are given in Figures 4 and 5 delivers power at maximum efficiency when the speed ratio of the converter is approximately .4, at which time the output shaft is rotating at .4 of the speed of the input shaft. At this speed ratio, the delivered torque is approximately twice the input torque. While the performance curves of different torque converters vary somewhat depending upon the design and construction and are affected by variations in the input speed, the dotted line curve given in Figure 4 may be considered representative for a constant input speed condition.

It will be apparent from the above mentioned performance curves that a torque converter provides an automatic change speed transmission which progressively reduces its torque multiplication as the output speed approaches that of the input speed. As a result, torque converters provide high starting torque and automatically decrease in torque multiplication as the load falls off. They are thus peculiarly suited for use in driving hoisting drums, particularly for heavy duty applications such as those involved in oil well drilling operations. As previously pointed out, however, they suffer the serious disadvantage that when operated at speed ratios of low efficiency, they are subject to overheating of the liquid. While they are customarily provided with a cooling radiator and fan for cooling the operating liquid, these cooling units are not adequate to take care of heavy duty operations involving an operation during substantial periods under stall or near stall conditions. The excessive power required to operate the cooling fan has heretofore limited the capacity of the cooling unit employed. Moreover, if an adequate cooling system were provided to dissipate the heat generated during operation under stall conditions, the power would be wasted and the liquid overcooled when the converter was operating at its more efficient speed ratios.

These defects are overcome in accordance with the present invention by providing a cooling system which performs a cooling function at a variable rate, depending upon the amount of heat generated in the unit. The primary features of the preferred form of this cooling system consist of a cooling radiator and an air circulating fan associated with the radiator and driven at a speed proportional to the extent to which the speed ratio of the converter departs from its ratio of maximum efficiency.

Thus, referring to Figure 1, the apparatus includes a cooling radiator 10 having a liquid inlet pipe 11 connected to the converter by an elongated tube 12 and a pipe 13 having a pair of branches 14 and 15. As best shown in Figure 3, the branch pipes 14 and 15 communicate with the interior of the casing 3 of the torque converter and hence may conduct a portion of the operating liquid from the converter to the radiator. Two branch pipes are preferably provided in order to facilitate flow of the liquid regardless of the direction in which the liquid is circulating around the core 8 of the impeller in order to more effectively cool the liquid when the output shaft is rotating in reverse at sufficient speed to reverse the direction of flow of the liquid, as may be the case if the unit is connected to a hoisting drum and utilized as a brake to control the rate of lowering of a hoisted weight. Thus, during normal operation the liquid circulates around the core 8 of the impeller in a clockwise direction, as viewed in Figure 3, and, consequently, may more effectively flow out through branch pipe 15. If, on the other hand, the output shaft 2 is rotating in reverse at sufficient speed to circulate the liquid in a counterclockwise direction around the core of the impeller, the liquid may more effectively discharge through the branch pipe 14.

As best shown in Figure 1, in order to prevent flow from the converter through pipe 15 and thence backwardly into the converter through pipe 14, or vice versa, the branch pipes 14 and 15 at their point of juncture are provided with a pivoted flap valve 16, which will permit flow from either pipe 14 or 15 to the tube 12 but will not permit flow from pipe 14 to pipe 15, or vice versa.

The radiator 10 is also provided with a return line 17 which leads to the interior of the torque converter, in the manner indicated in Figure 3, at a point adjacent the intake edges of the impeller blades 4.

As a result of this arrangement, the action of the converter, itself, will effect a circulation of operating liquid through the cooling radiator 10. The entire system, including the converter housing, radiator and connecting piping, is maintained full of liquid by means of a pump 18, which is driven by means of a belt 19 from the input shaft of the converter and which supplies liquid under pressure to the converter through pipe 20. The intake of the pump is connected by means of a pipe 21 to a reservoir 22 and the reservoir is connected by a pipe 23 to a high pressure region within the torque converter, in accordance with usual practice.

The cooling radiator 10 is provided with a fan 24 adapted to blow air through the radiator and thus cool the circulated liquid. The fan 24 is carried by a horizontal shaft 25 journaled at the upper end of a vertically projecting housing 26. The shaft 25 carries a bevel gear 27 which meshes with a bevel gear 28 on a vertical shaft 29, which is likewise journaled within the housing 26. Shaft 29 is operatively connected to a pair of shafts 30 and 31 by means of a differential gear mechanism in such a manner that the shaft 29 is differentially driven by the shafts 30 and 31. The differential gear mechanism, which is positioned within a housing 32, is not shown in detail but may correspond in design and construction to a conventional automobile differential bevel gear set with the shaft 29 corresponding to the vehicle propeller shaft and the shafts 30 and 31 corresponding to the aligned axle shafts.

Shaft 30 is connected by a chain 33 and suitable sprockets to the input shaft 1, while shaft 31 is connected by a pair of gears, not shown, to a shaft 34. The gears connecting shafts 31 and 34 are positioned within a housing 35 and are mounted, respectively, on the shafts 31 and 34. Shaft 34 is connected by a chain 36 and suitable sprockets to the output shaft 2 by a converter. It will be apparent from the above that the connections between the shafts 30 and 31 and the respective shafts 1 and 2 are such that when shafts 1 and 2 are rotating in the same direction, shafts 30 and 31 will be rotated in opposite directions. Since the shafts 30 and 31 are connected to the fan 24 through the previously mentioned differential gearing, it will be apparent that when they rotate in opposite directions at the same speed the fan 24 will be stationary, and that the speed of the fan will always be proportional to the difference between the speeds of the shafts 30 and 31. Consequently, the speed ratios of the drive connections between shaft 1 and shaft 30 and between shaft 2 and shaft 31 are preferably so chosen that when the torque converter is operating at its maximum efficient speed ratio, shafts 30 and 31 will rotate at the same speed but in opposite directions. For example, if the speed ratio of maximum efficiency is .4 and the speed ratio of the drive connection between shafts 1 and 30 and between shafts 2 and 34 is one to one, then the gearing in housing 35 connecting shafts 31 and 34 should be so chosen as to drive the shaft 31 at two and a half times the speed of shaft 34, but in the opposite direction.

As a result of this arrangement, the fan speed increases as the speed ratio of the converter either increases or decreases from its ratio of maximum efficiency, thereby increasing the cooling effect as the efficiency of the torque converter drops off. Thus, when the converter is operating at high efficiency, little energy is required to drive the cooling fan and the overall efficiency of the power transmission apparatus is greatly increased. In addition, when the torque converter is operating at speed ratios below that of maximum efficiency, not only is the fan rotated at a higher rate of speed in order to dissipate the additional heat generated in the operating liquid, but the differential fan drive, itself, transmits torque around the converter from the input shaft of the converter to the output shaft at substantially one hundred per cent efficiency. This is due to the fact that for a given torque applied to shaft 30 for the purpose of driving the fan, an equal reaction torque is applied to shaft 31 by the differential cage. This torque is multiplied two and a half times by the gearing in housing 35 and is thus transmitted to the output shaft 2 of the converter in the same direction as that in which the output shaft is driven by the converter, itself.

The advantage of this feature may be illustrated by the following example. If it be assumed that the engine which is connected to shaft 1 will deliver 150'# of torque and the torque which must be supplied by shaft 1 to the fan 24 in order to dissipate the heat generated when the output shaft 2 is stationary is 50'# and that the torque ratio of the converter under stall conditions is 5.25 to 1, then the torque delivered through the converter from shaft 1 to shaft 2 will be $5.25 \times 100 = 525'\#$, and the torque delivered around the converter through the differential fan drive will be $2\frac{1}{2} \times 50 = 125'\#$. There is thus delivered to the output shaft 2 a total torque of 650'# at stall, as compared with a maximum possible torque delivery of 525'# if the fan 24 were simply driven directly from shaft 1 without any differential connections to shaft 2. The amount of torque which is thus delivered through the differential fan drive increases with a decrease in the fan speed because it is always two and a half times the torque delivered to the fan from shaft 1 and the fan torque is a function of the square of the fan speed. The overall effect is to further increase the efficiency and delivered torque at all speed ratios below that of maximum efficiency.

When the speed ratio of the converter exceeds that of its maximum efficiency, the power to drive the fan must come from the driven element and, in that case, torque is fed back from the output shaft 2 to the input shaft 1. The result of this action is to place an additional load on the driven shaft 2 of the converter and thus tend to return the converter to a more efficient ratio for any given load. Thus, for example, if at a converter speed ratio of .6 the fan requires 12.5'# of torque at shaft 31, the converter output shaft 2 must deliver to the fan a torque of 2½×12.5=31.25'#. The fan torque reaction which is fed back to shaft 1 from the differential fan drive is 12.5'#. Consequently, the total torque delivered to shaft 1 by the engine and the fan equals 150+12.5=162.5'#. Since, as shown by the dotted line torque curve in Figure 4, the torque multiplication of the converter at a speed ratio of .6 to 1, then the converter will deliver to the output shaft 2 a torque of 162.5'#, and the net torque available at the output shaft will be 162.5−31.25=130.25'#. This contrasts with a net available torque of 100'#, which would be provided if a constant speed fan requiring 50'# of torque were employed.

Figure 5:
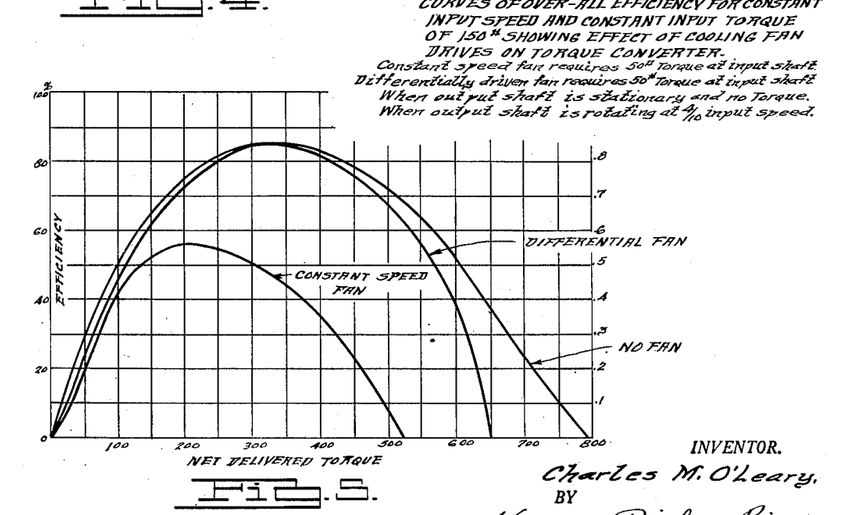

The curves of Figures 4 and 5 demonstrate the improvement in efficiency and net torque available as a result of the differential fan drive at all speed ratios. It will be appreciated that the increase in efficiency and torque will be greater or less, depending upon the torque required to drive the fan. Consequently, if the fan drive requires less than 50'# under stall conditions, the improvement in performance will be of the same kind but lesser in degree than that indicated in Figures 4 and 5.

It should be noted that with the above described differential fan drive, the fan remains stationary when the converter is operating at its ratio of maximum efficiency and rotates either in one direction or the other as the speed ratio falls below or exceeds the ratio of maximum efficiency. Consequently, a reversible type of fan blade should be employed and suitable shrouding provided, as indicated at 37, to insure adequate flow of air through the radiator 10 regardless of the direction of rotation of the fan 24. Since the fan remains stationary as long as the converter is operating at its ratio of maximum efficiency, it will effect no circulation of cooling air through the radiator under those conditions. Consequently, in order to dissipate the heat generated in the converter liquid when the converter is operating at maximum efficiency, it is necessary to provide a radiator 10 of such capacity that it will dissipate the required amount of heat without forced circulation of air or, alternatively, to provide a small auxiliary constant speed fan in conjunction with a small auxiliary radiator. This small cooling unit may be conveniently associated with the reservoir 22 and circulating pump 18, if desired.

The curves of Figures 4 and 5 are based on the assumption that the speed of input shaft 1 is substantially constant, which condition may not always be desirable since in some cases it is desired to reduce the engine speed. Such changes in engine speed do not materially affect the speed ratio at which maximum efficiency is achieved by the torque converter or the general form of the efficiency curve. Consequently, the differentially operated fan is required and will perform its same functions, regardless of variations in engine speed. The only difference will be that for reduced engine speeds at a given speed ratio the fan speed will be less than at higher engine speeds. This is not objectionable, particularly if the cooling mechanism is designed to dissipate the required heat at the engine speed of maximum power with wide open throttle.

It will be apparent that the amount of heat dissipated by the radiator 10 for any given speed of fan 24 will be proportional to the difference between the mean temperature of the liquid in the radiator and the temperature of the surrounding atmosphere. The drop in temperature in the radiator decreases with an increase in the rate of flow of liquid and, therefore, the mean temperature increases with an increase in the rate of flow. Therefore, the rate of heat dissipation is a function of the temperature of the liquid discharged from the torque converter and the rate at which that liquid flows through the radiator. Accordingly, there is provided in the preferred form of the invention illustrated auxiliary means to control the rate of cooling by controlling the rate of flow of liquid through the radiator. As best shown in Figure 1, this means comprises a valve 38 which is fixed to the end of an elongated rod 39 and which controls the rate of flow of liquid through the tube 12. The opposite end of the rod 39 is adjustably fixed to the opposite end of the tube 12 by means of a threaded plug 40. The tube 12 and rod 39 are formed of materials having dissimilar coefficients of thermal expansion, the material of the rod 39 having the greater coefficient, with the result that upon increases in the temperature of the liquid flowing through tube 12, the rod 39 will elongate relative to the tube 12 and thereby increase the opening for passage of the liquid through the tube. Suitable materials include steel for the tube and brass for the rod.

It will be observed that the valve head 38 is of slightly smaller diameter than the interior of tube 12, with the result that in no case will the flow through pipe 12 be blocked. The valve head is made of sufficient size to effect a substantial increase in the flow opening on a small movement of the valve, and the tube 12 is made of sufficient length to give the desired full valve travel on a temperature rise of the desired maximum. The shape of the valve and the pipe walls which surround the valve may be chosen to produce a variation in the area of the flow passage, in accordance with any desired mathematical function of the change in temperature. As a result of this arrangement, the amount of energy which is diverted to circulate the operating liquid through the cooling radiator is a minimum until the temperature of the operating liquid exceeds a desired value and then increases with any rise in temperature.

The pumping effect of the blades of the converter will ordinarily be sufficient to circulate any desired amount of liquid through the cooling radiator, but it will be appreciated that, if desired, an additional circulating pump may be employed for that purpose.

While either the differentially operated fan or the thermostatically controlled valve 38 may be employed alone to vary the rate of cooling to meet the needs of the converter operation, it is preferred to employ the differentially operated fan because of its beneficial effect upon the efficiency and delivered torque of the system and the fact that by the use of a circulating fan the size of cooling radiator may be materially decreased. The preferred arrangement involves the use of both the differentially operated fan and thermostatically controlled valve, since the thermostatic valve modifies the cooling effect of the fan to bring the rate of heat dissipation into closer conformance to theoretical requirements than is possible with the differential fan alone.

Figures 6, 7, 8:
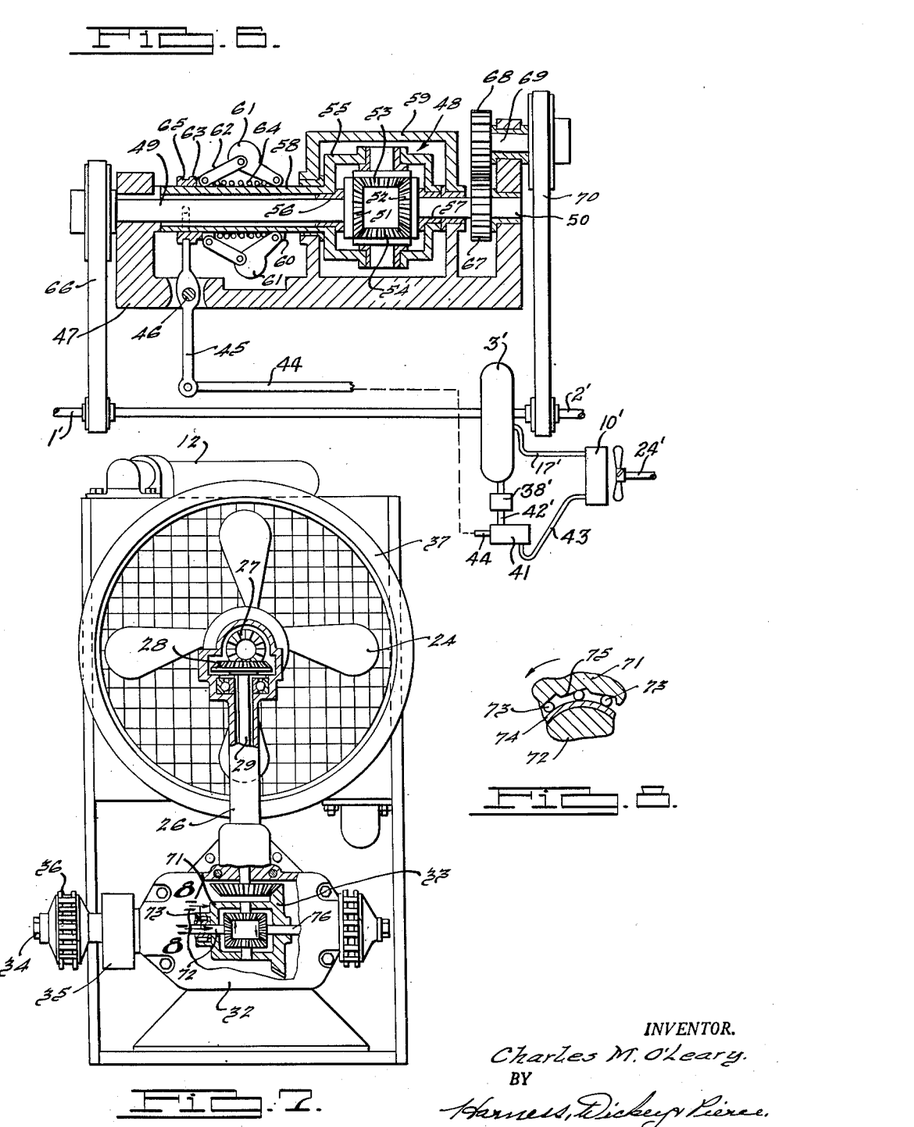
Figure 6 is a fragmentary section of a modified form of the invention.
Figure 7 is a more or less diagrammatic illustration of a further modification of the invention.
Figure 8 is a fragmentary section taken on the line 8—8 of Figure 7.

Figure 6 illustrates a modified type of cooling control which may be employed in place of that illustrated in Figure 1. In this form of the invention, the fluid lines containing the radiator are equipped with a differentially controlled valve for controlling the rate of flow of operating liquid through the radiator. As shown in Figure 6, there is provided a balanced valve 41 of conventional construction which controls the rate of flow between the pipes 42 and 43, which connect the outlet port of the torque converter 3' to the inlet of the cooling radiator 10'.

Valve 41 is provided with an operating rod 44 connected to a lever 45 pivotally supported at 46 to a stationary bracket 47, which may be fixed to the frame of the torque converter in any convenient position. The bracket 47 carries a differential gear set, indicated generally at 48. This gear set includes a pair of driving shafts 49 and 50 provided, respectively, with bevel gears 51 and 52, each of which meshes with a pair of bevel gears 53 and 54 journaled in a cage 55. The cage is rotatably supported by means of bearings 56 and 57 on the shafts 49 and 50 and is provided with a sleeve extension 58 which projects from the housing 59 for the differential gearing. The sleeve 58 is provided with a pair of ears 60 on each of which is pivoted a governor weight 61. The weights are connected by means of links 62 to a collar 63, which is slidable upon the sleeve 58. A spring 64 surrounds the sleeve and normally urges the collar 63 to the left, as viewed in Figure 6.

The inner end of the lever 45 is bifurcated and provided with a pair of inwardly extending projections on either side of the collar 63 which project into the channel 65 formed in the collar in the manner common to clutch operating yokes. As a result of this arrangement, the axial position of the collar 63 is a function of the speed of rotation of the sleeve 58, which, in turn, is a function of the speeds of the shafts 49 and 50. Shaft 49 is connected to the input shaft 1' of the torque converter 3' by means of a belt 66 and suitable pulleys. Shaft 50 is provided with a spur gear 67 which meshes with a spur gear 68 on a countershaft 69. The countershaft 69 is connected to the output shaft 2' of the torque converter 3' by a belt 70 and suitable pulleys. As in the construction of Figure 2, the size of the pulleys and gears in the drive connections to the shafts 49 and 50 are so selected that the shafts 49 and 50 operate at the same speed but in opposite directions when the speed ratio of the torque converter corresponds to its ratio of maximum efficiency. Under these circumstances, the spring 64 will shift the collar 63 to the left and close the valve 41 to its maximum extent. The valve is preferably so constructed that in this position a limited flow through the valve is permitted. As the speed ratio of the driven shaft of the converter to the driving shaft falls below or exceeds the ratio of maximum efficiency, sleeve 58 will rotate in one direction or the other at a speed in proportion to the change in speed ratio of the torque converter and, therefore, the collar 63 will shift under the influence of the centrifugal weights 61 in a direction to open the valve 41 and increase the flow of operating liquid through the radiator, the rate of increase in flow being approximately proportional to the change in speed ratio and, therefore, approximately proportional to the heat generated in the converter.

The mechanism of Figure 6 may be used alone to vary the rate of cooling of the operating liquid, in which event the radiator will either be provided with no fan or, preferably, with a small fan 24' driven directly from the engine shaft. However, if desired and as shown diagrammatically in Fig. 6, it may be combined with a thermostatic valve 38' similar to that illustrated in Figure 1, the two control valves being connected in series in the radiator circulating system.

The use of both the thermostatic valve and the differentially controlled valve in series is of advantage since power is consumed in circulating liquid through the cooling system and there is no point in permitting such circulation if the liquid is not hot. After it becomes hot, control is taken over by the differential valve.

In addition, the differentially controlled valve may be combined with the differentially operated fan, in which event fan 24' may be driven by the mechanism shown in Figs. 2 and 7. Alternatively, both mechanisms may be connected to the hydrokinetic torque converter by a single differential gear set. In the latter case, the differential gear set of Figure 6 may be provided with a bevel gear mounted on the cage 55 and in mesh with a bevel gear on the lower end of shaft 29 of Figures 1, 2 and 7. It may be noted, however, that whereas the differential mechanism required to drive the fan must be of substantial size and power capacity, a relatively small and inexpensive differential gear set may be employed in the construction of Figure 6 since practically no power is required to shift the valve 41.

It may be noted that the type of differential gear set shown in Figure 6, with the addition of a bevel gear on the cage 55, is the type employed within the housing 32 of the form of invention shown in Figures 2 and 3.

In Figures 7 and 8 is illustrated a further modification of the invention peculiarly suited for use in hoisting drum drives where it is desired to employ the torque converter as a brake during reverse rotation of the hoisting drum. The mechanism of Figures 7 and 8 is identical to that of Figures 1, 2 and 3 except that the planet cage 71 of the differential gear set which drives the cooling fan, instead of being freely journaled on the differential shaft 72 which corresponds to shaft 31 of Figure 1, is connected to the shaft 72 by means of a one-way clutch of the roller type. Any suitable form of one-way clutch may be provided for this purpose so long as it operates to provide a driving connection between the shaft 72 and the planet cage 71 when the shaft 72 is rotating in the direction of the arrow in Figure 8 at a speed in excess of the speed of rotation of the planet cage 71 in the same direction. As illustrated fragmentarily in Figure 8, the clutch comprises a plurality of rollers 73 arranged between a hardened ring 74 mounted on the shaft 72 and the inner surface of a serrated opening in the cage 71. The serrations or notches formed in the cage 71 are provided with sloping walls 75 so arranged that when the shaft 72 tends to rotate in a counterclockwise direction, as viewed in Figure 8, relative to the cage 71, the rollers 73 will be wedged between the ring 74 and the sloping walls 75 and thus effect a driving connection. On reverse rotation of the shaft 72 relative to the cage 71, the clutch is disengaged.

As a result of the above described construction, when the output shaft of the converter is either stationary or rotating in the same direction as the input shaft, the planet cage is rotated in the direction indicated by the arrow in Figure 8 at a speed proportional to the difference between speeds of rotation of the differential shafts 72 and 76 and no driving connection exists between the planet cage 71 and the shaft 72. During this portion of the operation, the function of this form of the invention is identical to that previously described in connection with Figures 1 through 3. If, however, the converter output shaft rotates in reverse at a speed equal to the forward speed of the output shaft when the converter is operating at maximum efficiency, i. e. at .4 of the input speed for a converter having the curves shown in Figures 4 and 5, shafts 72 and 76 will rotate at the same speed in the same direction, as indicated by the arrow in Figure 8, and the planet cage 71 will likewise rotate at that speed in the same direction. Under these conditions, half of the power required to operate the fan is supplied by the output shaft of the converter and the other half by the input shaft. On any tendency of the output shaft of the converter to rotate at any higher speed in reverse, shaft 72 will tend to rotate in a counter-clockwise direction, as viewed in Figure 8, relative to the planet cage 71, thus effecting engagement of the one-way clutch.

When the one-way clutch is engaged, the differential gear set is locked up and, as long as there is no tendency of the shaft 72 to rotate at a speed in excess of the shaft 76, both said shafts and the planet cage 71 are locked together and rotate at the same speed. This establishes a positive direct drive from the output shaft of the converter through the differential gear set to the input shaft, and thus prevents the output shaft from rotating in reverse at a speed ratio relative to the input shaft any greater than that at which the one-way clutch engages. Consequently, in the example given, the output shaft of the converter would never operate in reverse at more than .4 of the input shaft speed. An important result of this arrangement is that after the output shaft has reached the critical reverse speed and the one-way clutch has engaged, all of the power required to drive the cooling fan is supplied by the output shaft and, in addition, the output shaft of the converter may supply the power necessary to drive the input shaft of the converter, thus making it possible to close the engine throttles. This not only limits the reverse speed ratio of the torque converter, which is desirable, but it greatly increases the braking torque available to resist the reverse rotation of the converter output shaft.

While in the particular form of invention illustrated in Figures 7 and 8 the auxiliary braking resistance becomes effective when the reverse speed ratio equals the forward speed ratio of maximum converter efficiency, it will be apparent that the same result may be achieved at any desired reverse speed ratio by providing an auxiliary reversing drive from the output shaft of the converter to the input shaft which is rendered effective in response to a reverse speed responsive device of any suitable type. In addition, if desired, instead of providing an automatically engageable one-way clutch between the planet cage 71 and the shaft 72, means may be provided in the form of a friction clutch for preventing relative rotation between the planet cage and the shaft 72 at the will of the operator. This arrangement has the advantage that the added braking torque, which, in the illustrated embodiment of the invention, is provided automatically at a predetermined speed ratio, may be imposed on the output shaft of the converter at any time at the will of the operator by simply engaging the clutch.

In applications where high reverse speeds may be encountered, it may be undesirable to drive the engine at the high speed at which the converter input shaft may be rotated by the falling load. For such applications, the engine may be connected to the converter input shaft by a one-way clutch, so that the converter input shaft may overrun the engine in a forward direction. If desired, the engine may be provided with a governor mechanism which will close the throttle when the engine speed reaches a desired maximum.

Because they do not multiply torque and are seldom used under conditions wherein there is substantial slip, hydrokinetic torque couplers have less need for the variable cooling mechanism of the present application. However, to the extent that they may require such auxiliary cooling mechanism, the principles of the present invention may be applied to a coupler in the same way that they are illustrated and described herein in connection with a hydrokinetic torque converter. However, in the case of a coupler, since its maximum efficiency is at a speed ratio of approximately one to one, the differential cooling fan will be stationary at a one to one ratio and will not ordinarily operate in reverse.

While in the ordinary hydrokinetic torque converter application it is preferred to have the point at which no fan rotation occurs coincide with the speed ratio of maximum efficiency, it will be apparent that any desired speed ratio may be selected as the null point of the fan operation and, in some cases, it may be advantageous to select other speed ratios. For example, if the hydrokinetic torque converter is associated with an automatic transmission mechanism which will not permit the speed ratio of the converter to exceed a value at or near the speed ratio of maximum efficiency, it may be advantageous to so construct the gear ratios to the differential fan that the null point in the fan operation coincides with a speed ratio slightly above the maximum speed ratio at which the converter will operate since, in that case, the fan will rotate to some degree even when the speed ratio of the converter is at its ratio of maximum efficiency. Such an arrangement would eliminate the necessity of auxiliary cooling means to dissipate the heat generated at maximum efficiency.

It is apparent that there is provided in accordance with the present invention a power transmitting mechanism incorporating a hydrokinetic torque converter having all the advantages of automatically variable speed and torque which flow from normal use of such torque converters plus the added advantage of increased torque transmission and improved efficiency, together with the provision of means automatically operable to dissipate all of the heat generated in the operating liquid of the converter during all possible conditions of operation, including extended operations under stall conditions and the use of the converter as a reverse brake. As a result of these features, the mechanism of the present invention is peculiarly suited for use in driving heavy duty hoisting drums such as are used in oil well drilling, logging operations and the like. For these purposes, the input shaft of the converter is directly connected to an internal combustion engine of any suitable type and the output shaft is connected to the hoisting drum either directly or through a change speed transmission mechanism. With such an arrangement, it is possible to control the operation of the hoisting drum in both directions entirely by a manipulation of the engine throttle. Thus, by increasing 2,589,120

13 the throttle opening of the engine, it is possible to elevate a suspended weight at any desired speed, maintain the weight suspended stationary or control its rate of descent. Since the design and construction of the internal combustion engine and the hoisting drum may be conventional, the manner in which they are associated with the power transmitting apparatus is obvious and is not illustrated and described herein.

While several forms of the invention have been illustrated and described, it will be apparent that others are available within the spirit of the invention and the scope of the appended claims.

What is claimed is:

1. In combination, a hydrokinetic torque transmitter having driving and driven elements, a fluid circulating system connected to the transmitter for circulating operating fluid through the transmitter, said system incorporating cooling means for the circulated fluid, one end of said system being connected to said transmitter at a high pressure region therein and the other end being connected to a low pressure region to enable the transmitter to effect circulation of fluid through the system, a control valve for controlling the rate of circulation of fluid through said system, and means for opening said valve in proportion to the difference in speed of the driving and driven elements of the transmitter.

2. In combination, a hydrokinetic torque transmitter having a centrifugal pump and a turbine provided with constantly open fluid passageways through which operating fluid may circulate from the pump to the turbine and back to the pump in a closed path, a bypass fluid circulating system connected to the transmitter for withdrawing operating fluid from the transmitter at one point and returning it to the transmitter at another point, fluid heat exchange means in said system for transferring heat from said circulating fluid to another fluid, and means for circulating one of said fluids through said heat exchange means at a rate proportional to the difference in speeds of the pump and turbine of the transmitter.

3. In combination, a hydrokinetic torque transmitter having driving and driven elements, a fluid circulating system connected to the transmitter for circulating operating fluid through the transmitter, fluid heat exchange means in said system for transferring heat from said circulating fluid to another fluid, means for effecting flow of one of said fluids through said heat exchange means, and a planetary differential gear drive for driving said last named means from both the driving and the driven elements of the transmitter at a speed proportional to the difference in speeds of the driving and driven elements.

4. In combination, a hydrokinetic torque transmitter having driving and driven elements, an auxiliary fluid circulating system connected to the transmitter for circulating operating fluid through the transmitter, fluid heat exchange means in said system for transferring heat from said circulating fluid to another fluid, means for effecting flow of one of said fluids through said heat exchange means, and a driving connection between said flow-effecting means and both said driving and driven elements of the transmitter, the connection between said flow-effecting means and said driving element being effective on forward rotation of the driving element to drive the means forwardly, and the connection between the flow-effecting means and the driven

14 element containing a one-way clutch through which the driven element, on reverse rotation, will drive the means forwardly.

5. In combination, a hydrokinetic torque converter having a centrifugal pump and a reaction turbine provided with constantly open fluid passageways through which operating fluid may circulate from the pump to the turbine and back to the pump in a closed path, a bypass fluid circulating system for withdrawing operating fluid from the converter at one point and returning it to the converter at another point, fluid heat exchange means in said system for transferring heat from said circulating fluid to another fluid, and means for effecting flow of one of said fluids through the heat exchange means at a rate in proportion to the extent that the ratio of the speeds of rotation of the pump and turbine departs from a predetermined ratio.

6. In combination, a hydrokinetic torque converter having driving and driven elements, a fluid circulating system for circulating operating fluid through the converter, a cooling radiator in said system, a fan for passing air through said radiator, and means for rotating said fan at a speed directly proportional to the extent that the ratio of speeds of rotation of the driving and driven elements departs from a predetermined ratio.

7. In combination, a hydrokinetic torque converter having driving and driven elements, a fluid circulating system for circulating operating fluid through the converter, a cooling radiator in said system, a fan for passing air through said radiator, and means for rotating said fan at a speed directly proportional to the extent that the ratio of speeds of rotation of the driving and driven elements departs from a predetermined ratio.

8. In combination, a hydrokinetic torque converter having driving and driven elements, a fluid circulating system for circulating operating fluid through the converter, a cooling radiator in said system, a fan for passing air through said radiator, and means for rotating said fan at a speed directly proportional to the extent that the ratio of speeds of rotation of the driving and driven elements departs in either direction from a predetermined ratio.

9. In combination, a hydrokinetic torque converter having driving and driven elements, a fluid circulating system for circulating operating fluid through the converter, a cooling radiator in said system, a fan for passing air through said radiator, and means for rotating said fan at a speed directly proportional to the extent that the ratio of speeds of rotation of the driving and driven elements departs in either direction from a predetermined ratio at which the converter delivers power at maximum efficiency.

10. In combination, a hydrokinetic torque converter having driving and driven elements, a fluid circulating system for circulating operating fluid through the converter, cooling means for the fluid in said system, a valve in said system for controlling the rate of flow of fluid therethrough, and means responsive to the difference in speeds of the driving and driven elements of the converter for controlling the degree of opening of said valve, said last named means being effective to open the valve as the ratio of speeds of the driving and driven members departs from a predetermined ratio.

11. In combination, a hydrokinetic torque converter having driving and driven elements, a fluid circulating system for circulating operating fluid through the converter, cooling means for the fluid in said system, a valve in said system for controlling the rate of flow of fluid therethrough, and means responsive to the difference in speeds of the driving and driven elements of the converter for controlling the degree of opening of said valve, said last named means being effective to open the valve as the ratio of speeds of the driving and driven members departs in either direction from a predetermined ratio.

12. In combination, a hydrokinetic torque transmitter having driving and driven elements, a liquid circulating system connected to the transmitter for circulating operating liquid through the transmitter, a cooling radiator in the system for cooling the liquid, a fan for causing a flow of air through the radiator, automatic means for controlling the rate of flow of liquid through the system in proportion to the temperature of the liquid and automatic means to rotate the fan in proportion to the extent that the speed ratio of the torque transmitter departs from a predetermined ratio.

13. In combination, a hydrokinetic torque transmitter having driving and driven elements, a fluid circulating system connected to the transmitter for circulating operating fluid through the transmitter, fluid heat exchange means in said system for transferring heat from said circulating fluid to another fluid, means for effecting flow of one of said fluids through said heat exchange means, means for driving said flow-effecting means differentially from said driving and driven elements at a speed proportional to the extent to which the speed ratio of the transmitter departs from a predetermined speed ratio, and means for establishing a positive reverse driving connection between said elements when the driven element rotates in reverse at a predetermined speed.

14. In combination, a hydrokinetic torque transmitter having driving and driven elements, a fluid circulating system connected to the transmitter for circulating operating fluid through the transmitter, fluid heat exchange means in said system for transferring heat from said circulating fluid to another fluid, means for effecting flow of one of said fluids through said heat exchange means, means for driving said flow-effecting means differentially from said driving and driven elements at a speed proportional to the extent to which the speed ratio of the transmitter departs from a predetermined speed ratio, and means for establishing a positive reverse driving connection between said elements when the driven element rotates in reverse at a speed having said predetermined ratio with respect to the speed of the input shaft.

15. In combination, a hydrokinetic torque transmitter having driving and driven elements, a fluid circulating system connected to the transmitter for circulating operating fluid through the transmitter, fluid heat exchange means in said system for transferring heat from said circulating fluid to another fluid, means for effecting flow of one of said fluids through said heat exchange means, means for driving said flow-effecting means differentially from said driving and driven elements at a speed proportional to the extent to which the speed ratio of the transmitter departs from a predetermined speed ratio, and means including a one-way clutch for establishing a positive reverse driving connection between said elements when the driven element rotates in reverse at a predetermined speed.

16. In combination, a hydrokinetic torque transmitter having driving and driven elements, a fluid circulating system connected to the transmitter for circulating operating fluid through the transmitter, fluid heat exchange means in said system for transferring heat from said circulating fluid to another fluid, means for effecting flow of one of said fluids through said heat exchange means, means for driving said flow-effecting means differentially from said driven and driven elements at a speed proportional to the extent to which the speed ratio of the transmitter departs from a predetermined speed ratio, and means including a one-way clutch for establishing a positive reverse driving connection between said elements when the driven element rotates in reverse at said speed having a predetermined ratio with respect to the speed of the input shaft.

CHARLES M. O'LEARY.

REFERENCES CITED

The following references are of record in the file of this patent:

UNITED STATES PATENTS

| Number | Name | Date |
| --- | --- | --- |
| 1,026,498 | Delaunay-Belleville | May 14, 1912 |
| 1,768,938 | Sinclair | July 1, 1930 |
| 2,004,019 | Swetenham | June 4, 1935 |
| 2,018,616 | Martyrer et al. | Oct. 22, 1935 |
| 2,185,498 | Carson et al. | Jan. 2, 1940 |
| 2,373,453 | Brunken | Apr. 10, 1945 |
| 2,423,812 | Karl et al. | July 8, 1947 |